O. C. PORTER.
RELEASING HOOK.
APPLICATION FILED MAY 26, 1908.
905,576.
Patented Dec. 1, 1908.
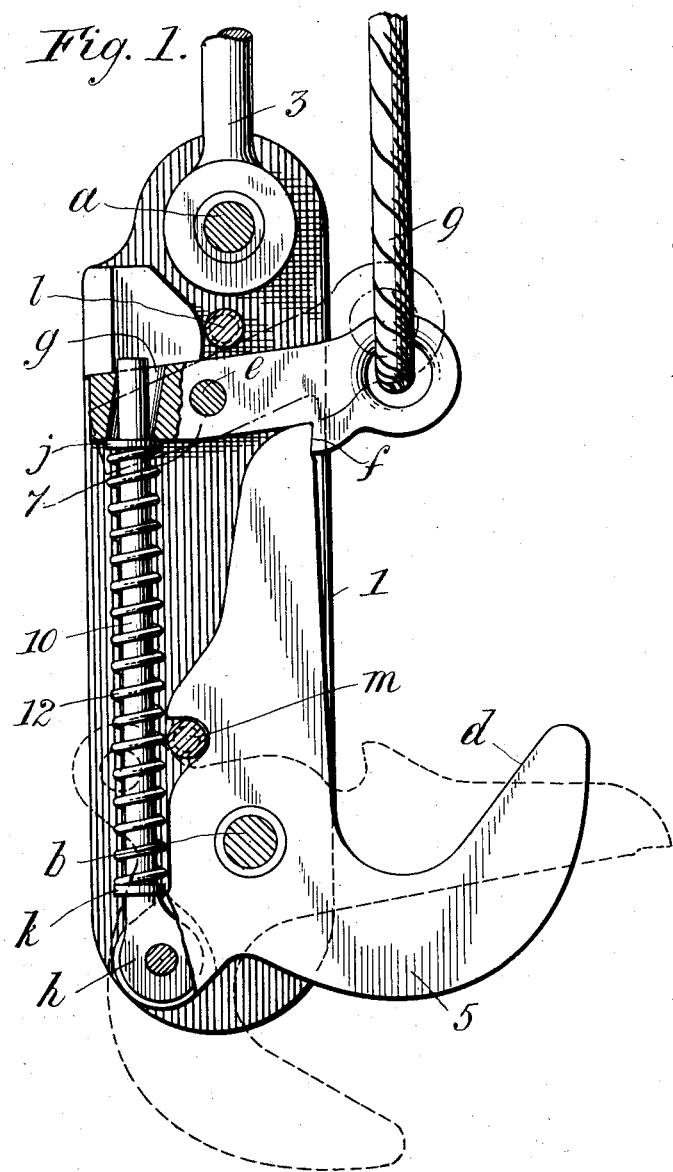
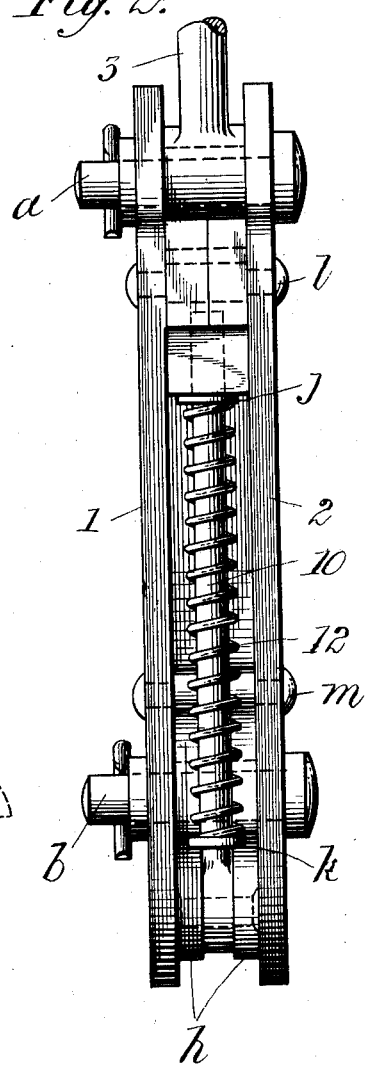
Witnesses
Frank B. Wooden.
Alberta Richards.
Inventor
Otis C. Porter.
By G. H. W. T. Howard.
Attorneys.

UNITED STATES PATENT OFFICE.

OTIS C. PORTER, OF BALTIMORE, MARYLAND.

RELEASING-HOOK.

No. 905,576.

Specification of Letters Patent.

Patented Dec. 1, 1908.

Application filed May 26, 1908. Serial No. 435,167.

*To all whom it may concern:*

Be it known that I, OTIS C. PORTER, of the city of Baltimore and the State of Maryland, have invented certain Improvements in Releasing-Hooks, of which the following is a specification.

This invention relates to an improved hook adapted to suspend an object such, for instance, as an anchor, and which is constructed to admit of the release of the object by manipulation of an element of the hook, after which the movable parts of the device revert to their original positions and the hook again becomes a supporting appliance, as will hereinafter fully appear.

In the description of the said invention which follows, reference is made to the accompanying drawing forming a part hereof, and in which,—

Figure 1 is a partly sectional side view of the improved releasing hook, and Fig. 2 a rear edge view of the same.

Referring now to the drawing, 1 and 2 are plates connected near their upper and lower ends by means of the studs $a$ and $b$.

3 is a supporting appliance of any approved description which is attached to the stud $a$.

5 is a hook the body of which is pivoted to the plates 1 and 2 by means of the stud $b$, and its curved end $d$ projects beyond the front edge of the plates sufficiently to admit of the attachment of the hook to the object to be suspended and from which it is to be ultimately detached.

7 is a latch pivoted at $e$ to the plates 1 and 2, having a toe $f$ adapted to engage the upper end of the body of the hook and thereby prevent the release of the hook or its change in position as shown by its dotted delineation in Fig. 1.

The lifting of the latch to effect the release of the hook is intended to be performed by hand through the medium of a cord 9 which is attached to an eye at the end of the latch, as shown in Fig. 1.

The portion of the latch extending rearward of the said plates is provided with a hole $g$, and the body of the hook with a tail-piece $h$ to which a vertical rod 10 is hinged. The upper end of this rod extends into the hole $g$, and around the rod and confined endwise between a collar $k$ thereon and the loose washer $j$, is coiled the compressing spring 12.

The upward movement of the latch is limited by the pin $l$ and its downward motion by the stop $m$. An extreme backward movement of the body of the hook is prevented by the stop $m$.

It will be understood that the compressed spring 12 has a double function, that is to say, it yieldingly retains the latch in latching position, and the hook in the position indicated by its representation in full lines in Fig. 1.

To release the hook, the cord 9 is drawn when the latch is raised and the point of the hook falls due to the weight of the object suspended thereby. Upon the detachment of the said object from the hook, it together with the latch automatically revert to their original positions provided the strain on the cord is relaxed, the latch again engaging the end of the body which is thereby locked.

I claim as my invention,—

In a releasing hook, a pair of plates, a hook pivoted to and situated between the plates, the said hook having a tail-piece, a latch adapted to engage the hook and hold the same in holding position, combined with a spiral spring under compression, which unites the tail-piece of the hook with the latch, and thereby holds the said parts yieldingly together, substantially as specified.

OTIS C. PORTER.

Witnesses:
THOMAS G. HULL,
WM. T. HOWARD.